US012779932B2

(12) United States Patent
Eser et al.

(10) Patent No.: US 12,779,932 B2
(45) Date of Patent: Nov. 3, 2026

(54) HEAT TRANSFER MEDIUM CIRCUIT FOR A MOTOR VEHICLE

(71) Applicant: Vitesco Technologies GmbH, Regensburg (DE)

(72) Inventors: Gerhard Eser, Hemau (DE); Sebastian Brettner, Burglengenfeld (DE); Manuel Dillinger, Kelheim (DE); Markus Feulner, Ensdorf (DE)

(73) Assignee: Vitesco Technologies GmbH, Regensburg (DE)

( * ) Notice: Subject to any disclaimer, the term of this patent is extended or adjusted under 35 U.S.C. 154(b) by 537 days.

(21) Appl. No.: 18/067,001

(22) Filed: Dec. 15, 2022

(65) Prior Publication Data

US 2023/0118870 A1 Apr. 20, 2023

Related U.S. Application Data

(63) Continuation of application No. PCT/EP2021/065207, filed on Jun. 8, 2021.

(30) Foreign Application Priority Data

Jun. 25, 2020 (DE) ..................... 10 2020 207 927.7

(51) Int. Cl.
*B60H 1/00* (2006.01)
*B60K 1/00* (2006.01)
*B60K 11/02* (2006.01)

(52) U.S. Cl.
CPC ......... *B60H 1/00278* (2013.01); *B60H 1/004* (2013.01); *B60K 11/02* (2013.01);
(Continued)

(58) Field of Classification Search
CPC ............. B60H 1/32284; B60H 1/3228; B60H 2001/00935; B60H 1/00928;
(Continued)

(56) References Cited

U.S. PATENT DOCUMENTS 8,448,696 B2 5/2013 Johnston
2011/0296855 A1* 12/2011 Johnston ................ B60L 50/40 62/160
(Continued)

FOREIGN PATENT DOCUMENTS

CN 108284728 A 7/2018
DE 102018218474 A1 4/2020
(Continued)

OTHER PUBLICATIONS

International Search Report and Written Opinion dated Sep. 9, 2021 from corresponding International Patent Application No. PCT/EP2021/065207.

*Primary Examiner* — Craig M Schneider

(57) ABSTRACT

A heat transfer medium circuit for a motor vehicle has a first partial circuit having at least one heating device and/or at least one cooling device; a second partial circuit having an electric energy store for supplying an electric motor for driving the motor vehicle; and a mixing device, which is switched selectively to at least one first operating state, at least one second operating state, and at least one third operating state. The first partial circuit has at least one passenger compartment heating device for heating a passenger compartment and/or at least one passenger compartment cooling device for cooling a passenger compartment.

19 Claims, 2 Drawing Sheets

(52) U.S. Cl.
CPC ............... *B60H 2001/00307* (2013.01); *B60K 2001/005* (2013.01); *B60K 2001/006* (2013.01); *B60K 2001/008* (2013.01)

(58) Field of Classification Search
CPC ...... B60H 1/00878; B60H 1/22; B60H 1/143; B60H 1/02; B60H 2001/00307; B60H 1/00278; B60H 1/004
See application file for complete search history.

(56) References Cited

U.S. PATENT DOCUMENTS

| | | | | |
|---|---|---|---|---|
| 2012/0247716 | A1* | 10/2012 | Galtz | B60L 50/16 165/41 |
| 2013/0140001 | A1 | 6/2013 | Mandl | |
| 2015/0266392 | A1* | 9/2015 | Arai | B60H 1/00921 320/150 |
| 2016/0107506 | A1* | 4/2016 | Johnston | B60H 1/00278 165/202 |
| 2016/0318370 | A1 | 11/2016 | Rawlinson | |
| 2017/0106725 | A1* | 4/2017 | Kim | B60H 1/00428 |
| 2019/0375270 | A1* | 12/2019 | Boger | B60H 1/00392 |
| 2020/0062106 | A1 | 2/2020 | Wong | |
| 2022/0285756 | A1 | 9/2022 | Eser | |
| 2024/0092145 | A1* | 3/2024 | Yang | H01M 10/625 |

FOREIGN PATENT DOCUMENTS

| | | | |
|---|---|---|---|
| DE | 102019210575 | A1 | 1/2021 |
| EP | 3088230 | B1 | 12/2018 |

* cited by examiner

HEAT TRANSFER MEDIUM CIRCUIT FOR A MOTOR VEHICLE

CROSS-REFERENCE TO RELATED APPLICATIONS

This application claims priority to PCT Application PCT/EP2021/065207, filed Jun. 8, 2021, which claims priority to German Patent Application No. DE 10 2020 207 927.7, filed Jun. 25, 2020. The disclosures of the above applications are incorporated herein by reference.

FIELD OF THE INVENTION

The present invention relates to a heat transfer medium circuit for a motor vehicle, such as a passenger car, to a motor vehicle, such as a passenger car, having the heat transfer medium circuit, and to a method for operating the motor vehicle.

BACKGROUND OF THE INVENTION

Motor vehicles with vehicle-drive electric motors require electric energy stores for supplying the electric motors.

By heating such energy stores at low temperatures, their performance, reliability, versatility and/or service life is improved.

SUMMARY OF THE INVENTION

It is an object of the present invention to improve a motor vehicle and/or the operation thereof.

This object is achieved by a heat transfer medium circuit having the features described herein. Protection for a motor vehicle having a heat transfer medium circuit is described herein, and a method for operating a motor vehicle is described herein.

According to one embodiment of the present invention, a heat transfer medium circuit for or in a motor vehicle, in one embodiment for or in a passenger car, has a first partial circuit, which, for its part, has at least one heating device, which heats heat transfer medium flowing through the first partial circuit or is provided, or in an embodiment is set up or used, for this purpose, and/or has at least one cooling device, which cools (the) heat transfer medium flowing through the first partial circuit or is provided, set up or used, for this purpose.

In one embodiment, a heating device includes an internal combustion engine of the motor vehicle or a heat exchanger coupled (thermally) thereto. In addition or alternatively, in one embodiment, a heating device includes a fuel cell of the motor vehicle or a heat exchanger coupled (thermally) thereto. In addition or alternatively, in one embodiment, a heating device includes an electric or electrically operated heater, for example a PTC heater, of the motor vehicle, such as an engine heater and/or a passenger compartment heater, or a heat exchanger coupled (thermally) thereto. In addition or alternatively, in one embodiment, a heating device includes a heat pump, such as a heat pump coupled (thermally) to a refrigerant circuit, of the motor vehicle or a heat exchanger coupled (thermally) thereto.

According to one embodiment of the present invention, the heat transfer medium circuit has a second partial circuit having at least one electric energy store, which supplies at least one electric motor with electric energy or is provided, set up or used, for this purpose, which in turn drives the motor vehicle or is provided, set up or used, for this purpose.

According to one embodiment of the present invention, this electric energy store is heated and/or cooled by heat transfer medium flowing through the second partial circuit, or the heat transfer medium circuit is provided, set up, for this purpose or is used for this purpose.

According to one embodiment of the present invention, the heat transfer medium circuit has a mixing device, which is selectively switchable or switched to

- at least one first operating state, in which the mixing device directs a first fraction, which, in one embodiment, is equal to zero, of heat transfer medium flowing in(to the mixing device) from the first partial circuit into the second partial circuit and, in a further development, directs the remainder or the fraction, complementary to the first fraction, of heat transfer medium flowing in(to the mixing device) from the first partial circuit, that is to say, in one embodiment, all the heat transfer medium flowing in(to the mixing device) from the first partial circuit, (forward or back) into or in the first partial circuit; and
- at least one second operating state, in which the mixing device directs a second fraction, which differs from the first fraction and may be equal to 100%, of heat transfer medium flowing in(to the mixing device) from the first partial circuit, that is to say, in one embodiment, all the heat transfer medium flowing in(to the mixing device) from the first partial circuit, into the second partial circuit and returns or directs heat transfer medium flowing in(to the mixing device) from the second partial circuit, in one embodiment all the heat transfer medium flowing in(to the mixing device) from the second partial circuit, back into the first partial circuit, in one embodiment in flows or fluid passages which are separate from one another.

Thus, in one embodiment, the first and second partial circuits are separated from one another or connected in parallel (in terms of flow) by the mixing device in its first operating state, and are connected in series (in terms of flow) in the second operating state thereof.

As a result, it is possible, in one embodiment, for the energy store to be temperature-controlled by the first partial circuit in the second operating state, and for it to be heated in one embodiment, and it is thereby possible, in one embodiment, to improve the performance, reliability, versatility and/or service life and thus operation of the motor vehicle.

According to one embodiment of the present invention, the first partial circuit has at least one passenger compartment heating device, which heats a passenger compartment of the motor vehicle by using the heat transfer medium flowing through the first partial circuit or is provided, set up or used, for this purpose, and/or at least one passenger compartment cooling device, which cools the passenger compartment of the motor vehicle by the heat transfer medium flowing through the first partial circuit, or is provided, set up or used, for this purpose.

One embodiment of the present invention is thus based on the concept of directing heat transfer medium of a passenger compartment heat transfer medium (partial) circuit into the heat transfer medium (partial) circuit of the energy store in order to control the temperature of the store, such as directing heat transfer medium of a passenger compartment heating circuit into the heat transfer medium (partial) circuit of the energy store in order to heat the energy store.

It is thereby possible, in one embodiment, in comparison with (pure) heat transfer from the passenger compartment heat transfer medium (partial) circuit to or into the heat transfer medium (partial) circuit of the energy store only by heat exchangers, to improve the structural size and/or complexity and/or performance, reliability, versatility and/or service life and thus operation of the motor vehicle.

In addition or alternatively to this aspect of using a passenger compartment heat transfer medium (partial) circuit, the mixing device is, according to one embodiment of the present invention, switchable or switched to at least one third operating state, in which the mixing device directs a third fraction, which differs from the first and second fractions and, may lie between the first and second fractions or is greater than 0(%) and/or less than 100%, of heat transfer medium flowing in(to the mixing device) from the first partial circuit into the second partial circuit and returns or directs heat transfer medium flowing in(to the mixing device) from the second partial circuit back into the first partial circuit.

In one embodiment, in this third operating state, the mixing device directs the fraction, complementary to the third fraction, of heat transfer medium flowing in(to the mixing device) from the first partial circuit (forward or back) into or in the first partial circuit, and/or directs the remainder of the heat transfer medium flowing in(to the mixing device) from the second partial circuit, which is not directed into the first partial circuit, (forward or back) into or in the second partial circuit.

One embodiment of the present invention is thus based on the concept of providing a mixed mode, in one embodiment in addition to the parallel and the series mode or the parallel and series connection, in which (only) some of the heat transfer medium is branched off from the first partial circuit into the second partial circuit and mixed with heat transfer medium of the second partial circuit.

As a result, in one embodiment, better temperature control of the energy store is possible and it is thus possible, in one embodiment, to improve the performance, reliability, versatility and/or service life and thus operation of the motor vehicle.

Passenger compartment heating circuits or their heat transfer media often have a higher temperature than desired for controlling the temperature of electric energy stores or for their heating circuits. By virtue of the aforementioned mixing or branching off of partial flows, it is possible, in one embodiment, to use heat transfer medium from passenger compartment heating circuits for temperature control, such as heating, of electric energy stores.

Accordingly, in one embodiment, the two aspects of using a passenger compartment heat transfer medium (partial) circuit and of mixing or branching of partial flows is combined, without, however, the invention being restricted thereto.

In one embodiment, the mixing device is selectively switchable or switched to various third operating states, in each of which the mixing device directs a third fraction, which differs from the first and second fractions and from the third fractions of the other third operating states, which third fraction may in each case lie between the first and second fractions or is greater than 0(%) and/or less than 100%, of heat transfer medium flowing in(to the mixing device) from the first partial circuit into the second partial circuit and returns or directs heat transfer medium flowing in(to the mixing device) from the second partial circuit back into the first partial circuit.

In one embodiment, in this third operating state, the mixing device (in each case) directs the fraction, complementary to the (respective) third fraction, of heat transfer medium flowing in from the first partial circuit (forward or back) into or in the first partial circuit, and/or directs the remainder of the heat transfer medium flowing in(to the mixing device) from the second partial circuit, which is not directed into the first partial circuit, (forward or back) into or in the second partial circuit.

In one embodiment, the mixing device is continuously adjustable or adjusted between at least two of the operating states, in one embodiment continuously from the first operating state into the third operating state or one of the third operating states and/or from the second operating state into the third operating state or one of the third operating states and/or from one of the third operating states into another of the third operating states.

It is thereby possible, in one embodiment, to (further) optimize the temperature control, such as heating, of electric energy stores and thereby, in one embodiment, to improve the performance, reliability, versatility and/or service life and thus operation of the motor vehicle.

In one embodiment, the first fraction is at most 10%, and in an embodiment is at most 5%, in a further development 0%. In addition or alternatively, in one embodiment, the second fraction is at least 90%, in an embodiment is at least 95%, in a further development 100%. In other words, the first and second partial circuits are separated completely from one another or connected in parallel (in terms of flow) by the mixing device in its first operating state, and are (through-)connected in series (in terms of flow) in the second operating state thereof.

In addition or alternatively, in one embodiment, the third fraction of the third operating state or one or more of the third operating states is (in each case) at least 30% and/or at most 70%. In addition or alternatively, in one embodiment, the third fraction of at least one of the third operating states is (in each case) more than 0% and less than 30% and/or the third fraction of at least one of the third operating states is (in each case) more than 70% and less than 100%.

It is thereby possible, in one embodiment, to (further) optimize the temperature control, such as heating, of electric energy stores and thereby, in one embodiment, to improve the performance, reliability, versatility and/or service life and thus operation of the motor vehicle.

In one embodiment, the mixing device has at least one mixing valve, which, in one embodiment whose housing, has at least one first inlet, through which heat transfer medium is introduced or flows in(to the mixing device or mixing valve) from the first partial circuit or which is provided, set up or used, for this purpose, at least one first outlet, through which heat transfer medium is discharged or returned (from the mixing device or mixing valve) into the first partial circuit or which is provided, set up or used, for this purpose, at least one second inlet, through which heat transfer medium is introduced or flows from the second partial circuit (into the mixing device or mixing valve) or which is provided, set up or used, for this purpose, and at least one second outlet, through which heat transfer medium is discharged or returned (from the mixing device or mixing valve) into the second partial circuit or which is provided, set up or used, for this purpose.

The mixing valve, in one embodiment a valve member or control element of the mixing valve, is adjustable, in one embodiment rotatable, or adjusted, in one embodiment rotated, in one embodiment in the housing, selectively into, in one embodiment continuously between, at least one first switching position, in which the first inlet is connected, in one embodiment only, to the first outlet (in terms of flow, by the valve member or control element), and the second inlet is connected, in one embodiment only, to the second outlet (in terms of flow, by the valve member or control element);

at least one second switching position, in which the first inlet is connected, in one embodiment only, to the second outlet (in terms of flow, by the valve member or control element), and the second inlet is connected, in one embodiment only, to the first outlet (in terms of flow, by the valve member or control element); and one or more intermediate positions, in each of which the first inlet is connected to the first and second outlets (in terms of flow, by the valve member or control element), and the second inlet is connected to the first and second outlets (in terms of flow, by the valve member or control element).

As a result, in one embodiment, a compact heat transfer medium circuit or mixing device is achieved.

In one embodiment, the mixing device has at least one first multi-way valve, which, in one embodiment whose housing, has at least one inlet, through which heat transfer medium is introduced or flows in(to the mixing device or the first multi-way valve) from the first partial circuit or which is provided, set up or used, for this purpose, at least one first outlet, through which heat transfer medium is discharged or returned (from the mixing device or the first multi-way valve) into the first partial circuit or which is provided, set up or used, for this purpose, and at least one second outlet, through which heat transfer medium is discharged (from the mixing device or the first multi-way valve) into the second partial circuit, or which is provided, set up or used, for this purpose; and at least one second multi-way valve, which in one embodiment is parallel to and/or synchronized with the first multi-way valve, which, in one embodiment whose housing, has at least one inlet, through which heat transfer medium is introduced or flows in from the second partial circuit (into the mixing device or the second multi-way valve) or which is provided, set up or used, for this purpose, at least one first outlet, through which heat transfer medium is discharged (from the mixing device or the second multi-way valve) into the first partial circuit or which is provided, set up or used, for this purpose, and at least one second outlet, through which heat transfer medium is returned (from the mixing device or the second multi-way valve) into the second partial circuit, or which is provided, set up or used, for this purpose.

The first multi-way valve, in one embodiment a valve member or control element of the first multi-way valve, is adjustable, in one embodiment rotatable, or adjusted, in one embodiment rotated, in one embodiment in the housing thereof, in one embodiment selectively, into, continuously between, at least one first switching position, in which the inlet of the first multi-way valve is connected, in one embodiment only, to the first outlet thereof (in terms of flow, by the valve member or control element);

at least one second switching position, in which the inlet is connected, in one embodiment only, to the second outlet of the first multi-way valve (in terms of flow, by the valve member or control element); and one or more intermediate positions, in each of which the inlet is connected to the first and second outlets (in terms of flow, by the valve member or control element).

The second multi-way valve, in one embodiment a valve member or control element of the second multi-way valve, is adjustable, in one embodiment rotatable, or adjusted, in one embodiment rotated, in one embodiment in the housing thereof, in one embodiment selectively, into, continuously between, at least one first switching position, in which the inlet of the second multi-way valve is connected, in one embodiment only, to the first outlet thereof (in terms of flow, by the valve member or control element);

at least one second switching position, in which the inlet is connected, in one embodiment only, to the second outlet of the second multi-way valve (in terms of flow, by the valve member or control element); and one or more intermediate positions, in each of which the inlet is connected to the first and second outlets (in terms of flow, by the valve member or control element).

It is thereby possible in one embodiment to use simple(r) multi-way valves.

In one embodiment, the heat transfer medium circuit has at least one heat exchanger, which transfers heat between the first and second partial circuits or is provided, set up or used, for this purpose.

It is thereby possible, in one embodiment, to (further) optimize the temperature control, such as heating, of electric energy stores and thereby, in one embodiment, to improve the performance, reliability, versatility and/or service life and thus operation of the motor vehicle.

In one embodiment, the heat transfer medium circuit has a third partial circuit having at least one electric motor, which is supplied with electric energy by the electric energy store, drives the motor vehicle and is heated and/or cooled by heat transfer medium flowing through the third partial circuit, or the heat transfer medium circuit or electric motor, energy store or third partial circuit is provided, or set up, for this purpose or is used for this purpose.

In one embodiment, the heat transfer medium circuit has a switching device, which is selectively switchable or switched to at least one first operating state, in which the switching device directs a first fraction, which, may also be equal to zero, of heat transfer medium flowing in(to the switching device) from the second partial circuit into the third partial circuit and, in a further development, directs the remainder or the fraction, complementary to the first fraction, of heat transfer medium flowing in(to the switching device) from the second partial circuit, that is to say, in one embodiment, all the heat transfer medium flowing in(to the switching device) from the second partial circuit, (forward or back) into or in the second partial circuit; and at least one second operating state, in which the switching device directs a second fraction, which differs from the first fraction and may be equal to 100%, of heat transfer medium flowing in(to the switching device) from the second partial circuit, that is to say, in one embodiment, all the heat transfer medium flowing in(to the switching device) from the second partial circuit, into the third partial circuit and, in one embodiment, returns or directs heat transfer medium flowing in(to the switching device) from the third partial circuit, in one embodiment all the heat transfer medium flowing in(to the switching device) from the third partial circuit, back into the second partial circuit, in one embodiment in flows or fluid passages which are separate from one another.

Thus, in one embodiment, the second and third partial circuits are separated from one another or connected in parallel (in terms of flow) by the switching device in its first operating state, and are connected in series (in terms of flow) in the second operating state thereof.

As a result, it is possible, in one embodiment, for the energy store to be temperature-controlled, in one embodiment heated, by the third partial circuit in the second operating state, and it is thereby possible, in one embodiment, to improve the performance, reliability, versatility and/or service life and thus operation of the motor vehicle.

In one embodiment, the switching device is switchable or switched, in one embodiment selectively, into one or more third operating states, in which the switching device (in each case) directs a third fraction, which differs from the first and second fractions, which third fraction may, (in each case) lie between the first and second fractions or is greater than 0(%) and/or less than 100% and/or may differ from the third fractions of the other third operating states, of heat transfer medium flowing in(to the switching device) from the second partial circuit into the third partial circuit and returns or directs heat transfer medium flowing in(to the switching device) from the third partial circuit back into the second partial circuit.

In one embodiment, in this third operating state or one or more of these third operating states, the switching device (in each case) directs the fraction, complementary to the (respective) third fraction, of heat transfer medium flowing in(to the switching device) from the second partial circuit (forward or back) into or in the second partial circuit, and/or directs the remainder of the heat transfer medium flowing in(to the switching device) from the third partial circuit, which is not directed into the second partial circuit, (forward or back) into or in the third partial circuit.

In one embodiment, the switching device is continuously adjustable or adjusted between at least two of the operating states, in one embodiment continuously from the first operating state into the third operating state or one of the third operating states and/or from the second operating state into the third operating state or one of the third operating states and/or from one of the third operating states to another of the third operating state.

In this way, in one embodiment, features analogous to those described above with respect to the first partial circuit may be achieved. Correspondingly, it is also possible in one embodiment for the switching device to be implemented as explained above with reference to the mixing device. Similarly, in one embodiment, the switching device may also have a 4/2-way valve or the like.

According to one embodiment of the present invention, the motor vehicle has at least one electric motor, which drives the motor vehicle or is provided, set up or used, for this purpose, and a heat transfer medium circuit, which is described here and whose at least one electric energy store, which is heated and/or cooled by heat transfer medium which flows through the second partial circuit, supplies this at least one electric motor with electric energy or is provided, set up or used, for this purpose.

In one embodiment, the motor vehicle is an electric vehicle, in one embodiment purely an electric vehicle.

The present invention is used for this purpose, especially since the waste heat of driving internal combustion engines or the like is not available.

In another embodiment, the motor vehicle has at least one internal combustion engine for driving the motor vehicle together and/or alternately with the at least one electric motor, and, in one embodiment, this engine is a heating device for heating the heat transfer medium flowing through the first partial circuit or is coupled (thermally) to such a device. In addition or alternatively, in one embodiment, the motor vehicle has at least one fuel cell, in one embodiment for supplying the at least one electric motor with electric energy, which, in one embodiment, is a heating device for heating heat transfer medium flowing through the first partial circuit or is coupled (thermally) to such a device.

The present invention may be used for this purpose, especially on account of the waste heat of the driving internal combustion engine or fuel cell.

In one embodiment, the first partial circuit and/or the second partial circuit and/or the third partial circuit (in each case) have/has at least one heater, which is electric in one embodiment, such as a PTC heater or the like.

As a result, in one embodiment, the energy store may be heated and it is thereby possible, in one embodiment, to improve the performance, reliability, versatility and/or service life and thus operation of the motor vehicle.

BRIEF DESCRIPTION OF THE DRAWINGS

Further advantages and features will emerge from the exemplary embodiments. In this respect, in part schematically.

DETAILED DESCRIPTION OF THE PREFERRED EMBODIMENT

The following description of the preferred embodiment(s) is merely exemplary in nature and is in no way intended to limit the invention, its application, or uses.

Figure 1:
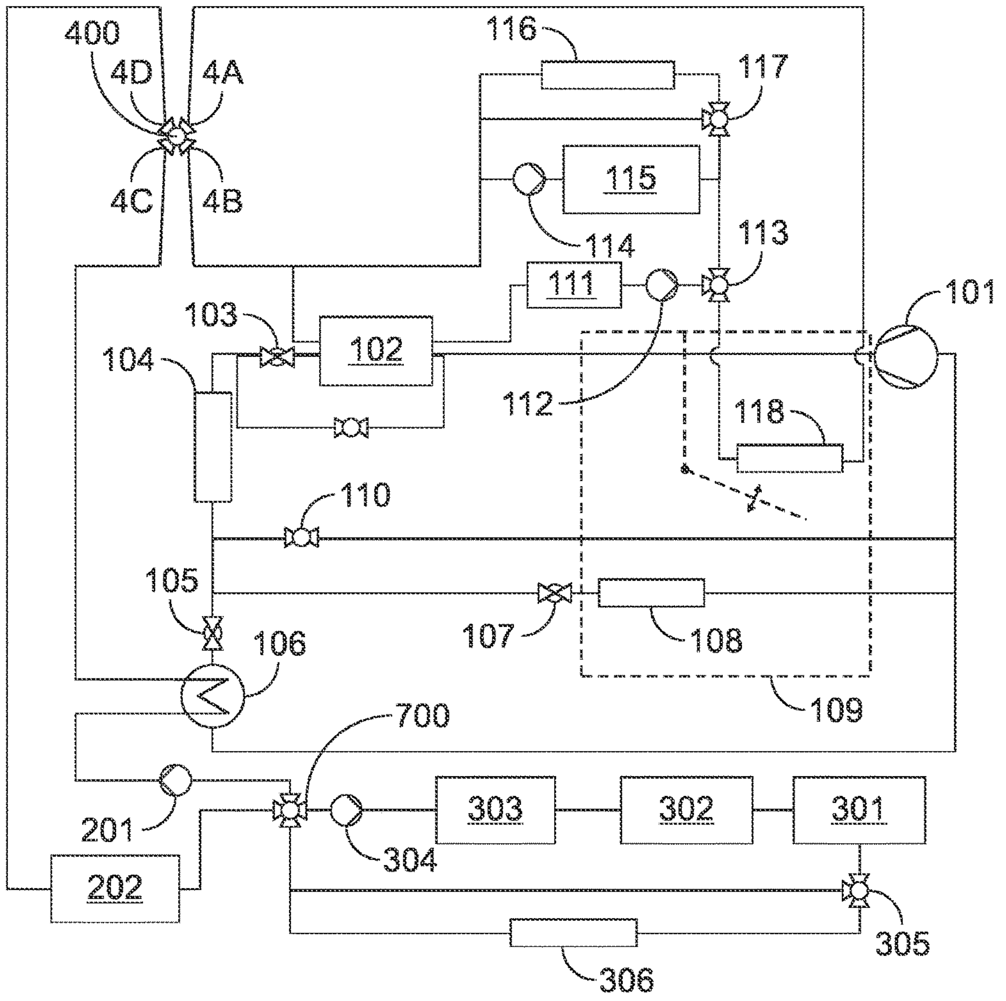
FIG. 1 shows a heat transfer medium circuit according to one embodiment of the present invention.

FIG. 1 shows a heat transfer medium circuit according to one embodiment of the present invention.

The heat transfer medium circuit has a first partial circuit having a compressor 101, a condenser 102, an expansion valve 103, a heat exchanger 104 on the front side of the vehicle, a further expansion valve 105 and a further heat exchanger 106, which are connected in series. A further expansion valve 107 and an air conditioning system evaporator 108 for cooling a passenger compartment 109 are connected in series with one another in parallel with the expansion valve 105 and the heat exchanger 106. A control valve 110 is connected in parallel therewith.

A PTC heater 111 connected in series with a pump 112 and a 3/2-way valve 113, a driving internal combustion engine 115 connected in series with a pump 114, and a radiator 116 and a thermostat 117 are connected in parallel with one another and connected in series with a heat exchanger 118 for heating the passenger compartment 109 and the condenser 102.

The heat transfer medium circuit furthermore has a second partial circuit having a pump 201 and a battery 202 for supplying an electric motor 301, which is thermally coupled to the first partial circuit via the heat exchanger 106.

The heat transfer medium circuit furthermore has a third partial circuit having the electric motor 301, a power electronics system 302, a charging device 303, a pump 304, a 3/2-way valve 305 and a radiator 306.

Figure 2:
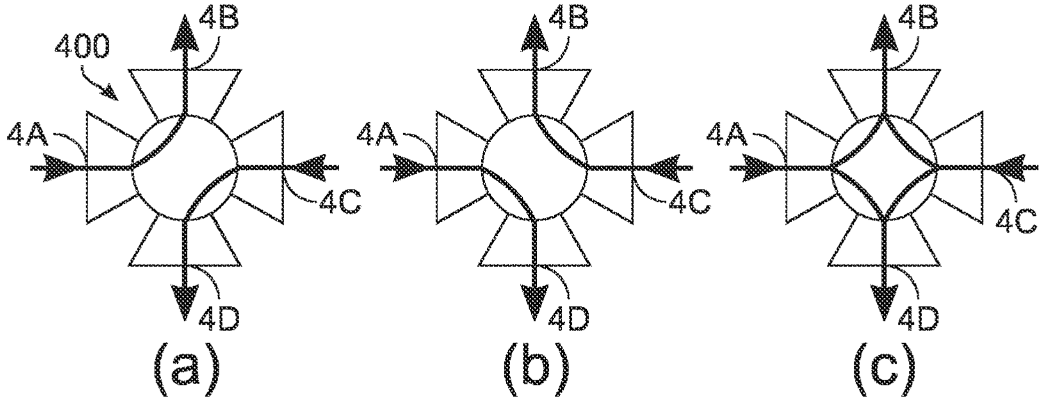
FIG. 2 shows a mixing valve of the heat transfer medium circuit in various operating states or (switching) positions.

The heat transfer medium circuit furthermore has a mixing device with a mixing valve 400 having a first inlet 4A for introducing heat transfer medium from the first partial circuit, a first outlet 4B for discharging heat transfer medium into the first partial circuit, a second inlet 4C for introducing heat transfer medium from the second partial circuit and a second outlet 4D for discharging heat transfer medium into the second partial circuit, which valve is illustrated in various operating states or (switching) positions in FIG. 2.

In a first operating state or first switching position (FIG. 2 (*a*)), the first inlet 4A is connected (only) to the first outlet 4B, and the second inlet 4C is connected (only) to the second outlet 4D, with the result that a first fraction of 0% of heat transfer medium flowing in from the first partial circuit is directed into the second partial circuit, and a fraction, complementary thereto, of 100% is directed into the first partial circuit, and all the heat transfer medium flowing into inlet 4C is directed out of the second outlet 4D into the second partial circuit, i.e. the first and second partial circuits are separated from one another in terms of flow or are connected in parallel.

In a second operating state or second switching position (FIG. 2 (*b*)), the first inlet 4A is connected (only) to the second outlet 4D, and the second inlet 4C is connected (only) to the first outlet 4B, with the result that a second fraction of 100% of heat transfer medium flowing in from the first partial circuit is directed into the second partial circuit, and all the heat transfer medium flowing into inlet 4C is directed out of the first outlet 4B into the first partial circuit, i.e. the first and second partial circuits are connected in series.

In several third operating states or intermediate positions, one of which is shown in FIG. 2 (*c*), the first inlet 4A is connected to the first outlet 4B and the second outlet 4D, and the second inlet 4C is connected to the first outlet 4B and the second outlet 4D, with the result that, depending on the switching position of the mixing valve 400, various third fractions, for example 30%, 50% or 70%, of heat transfer medium flowing in from the first partial circuit are directed into the second partial circuit, i.e. some of the heat transfer medium of the first partial circuit is branched off into the second partial circuit and mixed with it.

The third partial circuit may be selectively connected in series with or separated from the second partial circuit by a switching device with a 4/2-way valve 700, which is selectively switched into a first operating state for directing a first fraction of 0% of heat transfer medium flowing in from the second partial circuit into the third partial circuit, and a second operating state for directing a second fraction, which differs from the first fraction, of 100% of heat transfer medium flowing in from the second partial circuit into the third partial circuit.

Figure 3:
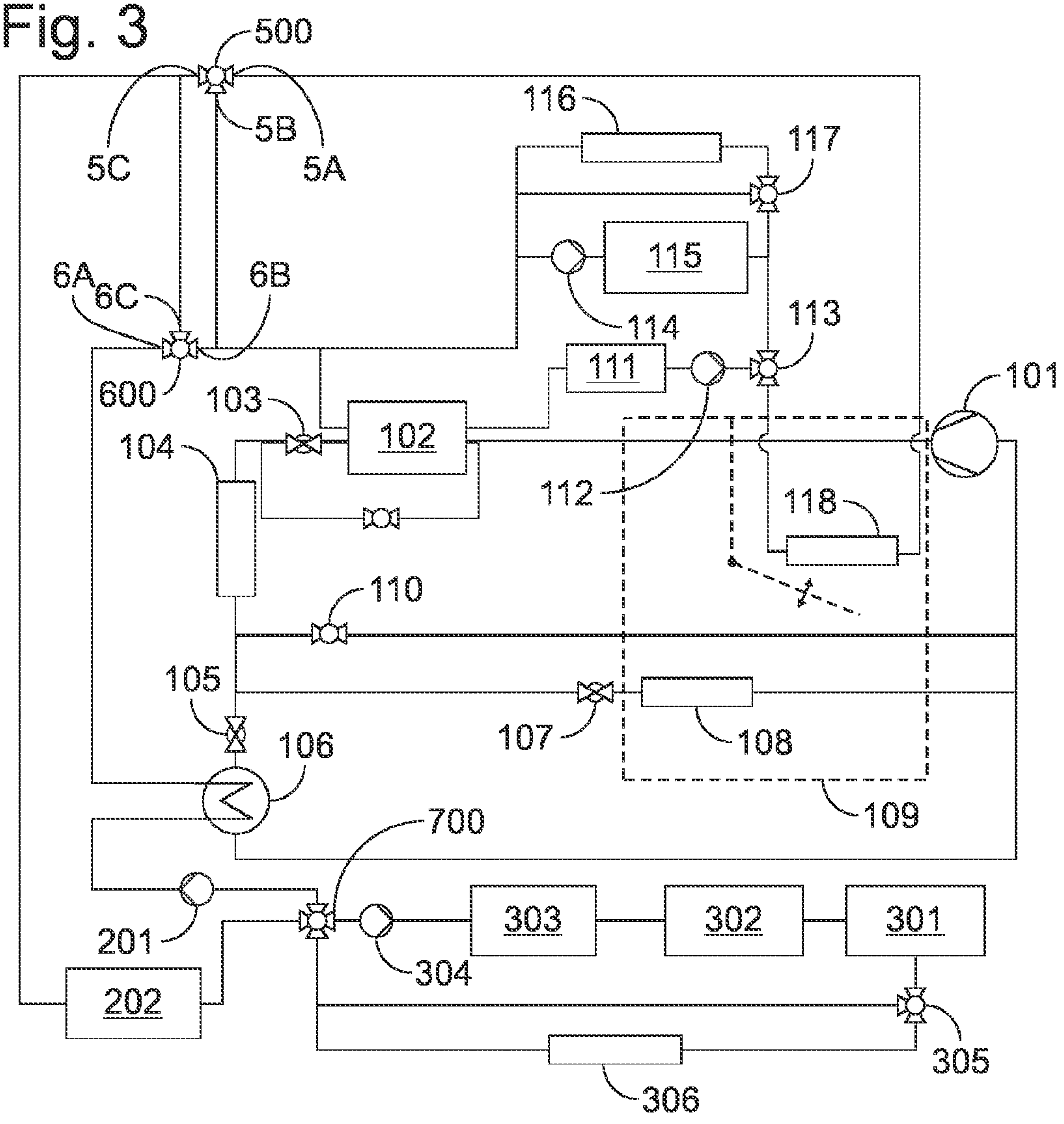
FIG. 3 shows a heat transfer medium circuit according to a further embodiment of the present invention.

FIG. 3 shows a heat transfer medium circuit according to a further embodiment of the present invention in an illustration corresponding to FIG. 1. Features corresponding to one another are identified by identical reference signs, and therefore reference is made to the above description and only points of differentiation are discussed below.

In the embodiment of FIG. 3, instead of the mixing valve 400, the mixing device has two parallel and mutually synchronized multi-way valves 500, 600.

The first multi-way valve 500 has an inlet 5A for introducing heat transfer medium from the first partial circuit, a first outlet 5B for discharging heat transfer medium into the first partial circuit, and a second outlet 5C for discharging heat transfer medium into the second partial circuit.

The second multi-way valve 600 has an inlet 6A for introducing heat transfer medium from the second partial circuit, a first outlet 6B for discharging heat transfer medium into the first partial circuit, and a second outlet 6C for discharging heat transfer medium into the second partial circuit.

In a first switching position of the first multi-way valve 500, its inlet 5A is connected only to the first outlet 5B, in a second switching position the inlet 5A is connected only to the second outlet 5C, and in a plurality of intermediate positions the inlet 5A is connected in each case to the first and second outlets 5B, 5C, wherein in the various intermediate positions different fractions of the heat transfer medium flowing in through the inlet 5A are directed into or through the first outlet 5B, and the remainder or complementary fraction is in each case directed into or through the second outlet 5C, e.g. in an intermediate position 30% into or through 5B and 70% into or through 5C, in an (other) intermediate position 50% into or through 5B and 50% into or through 5C, and/or in an (other) intermediate position 70% into or through 5B and 30% into or through 5C.

In a first switching position of the second multi-way valve 600, its inlet 6A is connected only to the first outlet 6B, in a second switching position the inlet 6A is connected only to the second outlet 6C, and in a plurality of intermediate positions the inlet 6A is in each case connected to the first and second outlets 6B, 6C, wherein in the various intermediate positions different fractions of the heat transfer medium flowing in through the inlet 6A are directed into or through the first outlet 6B, and the remainder or complementary fraction is in each case directed into or through the second outlet 6C, e.g. in an intermediate position 30% into or through 6B and 70% into or through 6C, in an (other) intermediate position 50% into or through 6B and 50% into or through 6C, and/or in an (other) intermediate position 70% into or through 6B and 30% into or through 6C.

In this way, it is possible analogously for the first and second partial circuits to be separated from one another (first multi-way valve 500: first switching position 5A→5B; second multi-way valve 600: second switching position 6A→6C) or connected in series (first multi-way valve 500: second switching position 5A→5C; second multi-way valve 600: first switching position 6A→6B) or some of the heat transfer medium of the first partial circuit is branched off into the second partial circuit and mixed with it (first multi-way valve 500: intermediate position 5A→5B, 5C; second multi-way valve 600: intermediate position 6A→6B, 6C).

Although exemplary embodiments have been explained in the above description, it should be pointed out that numerous modifications are possible. It should be noted, furthermore, that the exemplary embodiments are merely examples which are in no way intended to limit the scope of protection, the applications, and the structure. Instead, the above description gives a person skilled in the art a guideline for the realization of at least one exemplary embodiment, and various changes may be made here, such as with regard to the function and arrangement of the component parts described, without departing from the scope of protection resulting from the feature combinations equivalent thereto.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

4A First mixing valve inlet
4B First mixing valve outlet

4C Second mixing valve inlet
4D Second mixing valve outlet
5A Inlet of the first multi-way valve
5B First outlet of the first multi-way valve
5C Second outlet of the first multi-way valve
6A Inlet of the second multi-way valve
6B First outlet of the second multi-way valve
6C Second outlet of the second multi-way valve
101 Compressor
102 Condenser
103 Expansion valve
104 Heat exchanger
105 Expansion valve
106 Heat exchanger
107 Expansion valve
108 Air-conditioning system evaporator
109 Passenger compartment
110 Control valve
111 PTC heater
112 Pump
113 3/2-way valve
114 Pump
115 Driving internal combustion engine
116 Radiator
117 Thermostat
118 Heat exchanger
201 Pump
202 Battery
301 Electric motor
302 Power electronics system
303 Charging device
304 Pump
305 3/2-way valve
306 Radiator
400 Mixing valve
500 First multi-way valve
600 Second multi-way valve
700 4/2-way valve

What is claimed is:

1. A heat transfer medium circuit for a motor vehicle, the heat transfer medium circuit comprising:
- a first partial heat transfer medium circuit, further comprising:
  - at least one heating device for heating a heat transfer medium flowing through the first partial heat transfer medium circuit;
  - at least one cooling device for cooling the heat transfer medium flowing through the first partial heat transfer medium circuit;
  - at least one passenger compartment heating device for heating a passenger compartment by the heat transfer medium flowing through the first partial heat transfer medium circuit;
- a first partial circuit, further comprising:
  - at least one passenger compartment cooling device for cooling the passenger compartment by a heat transfer medium flowing through the first partial circuit;
- a second partial circuit, further comprising:
  - at least one electric energy store, which is heated or cooled by a heat transfer medium flowing through the second partial circuit, for supplying at least one electric motor for driving the motor vehicle;
- a mixing device in selective fluid communication with the first partial heat transfer medium circuit and the second partial circuit;

- a plurality of operating states, further comprising:
  - at least one first operating state, and during the first operating state, the first partial heat transfer medium circuit and the second partial circuit are separated from one another in terms of flow;
  - at least one second operating state, and during the second operating state, a first fraction of heat transfer medium, flowing in from the first partial heat transfer medium circuit is directed into the second partial circuit, and a second fraction of heat transfer medium flowing in from the second partial circuit is returned into the first partial heat transfer medium circuit; and
  - at least one third operating state, and during the third operating state, a third fraction of heat transfer medium, flowing into the mixing device from the first partial heat transfer medium circuit is partially directed into the second partial circuit and partially returned to the first partial heat transfer medium circuit, and a fourth the fraction of heat transfer medium flowing into the mixing device from the second partial circuit is partially directed into the first partial heat transfer medium circuit, and is partially returned into the second partial circuit;
  - wherein the mixing device is switched to one of the at least one first operating state, the at least one second operating state, and the at least one third operating state.

2. The heat transfer medium circuit of claim 1, the at least one third operating state further comprising:
- a plurality of intermediate positions;
- wherein the mixing device is switched selectively to one or more of the plurality of intermediate positions of the third operating state such that in each case the portion of the third fraction of heat transfer medium flowing into the mixing device from the first partial heat transfer medium circuit into the second partial circuit is unequal to the portion of the third faction of heat transfer medium flowing into the mixing device from first partial heat transfer medium circuit and returning into the first partial heat transfer medium circuit.

3. The heat transfer medium circuit of claim 2, wherein the mixing device is adjusted continuously between at least two of the plurality of operating states.

4. The heat transfer medium circuit of claim 2, wherein the first fraction is at most 10%, and/or the second fraction is at least 90%, and/or the third fraction of at least one third operating state is between 30% and 70%.

5. The heat transfer medium circuit of claim 1, the mixing device further comprising at least one mixing valve.

6. The heat transfer medium circuit of claim 5, the at least one mixing valve further comprising:
- at least one first inlet for introducing heat transfer medium from the first partial heat transfer medium circuit;
- at least one first outlet for discharging heat transfer medium into the first partial heat transfer medium circuit;
- at least one second inlet for introducing heat transfer medium from the second partial circuit;
- at least one second outlet for discharging heat transfer medium into the second partial circuit;
- at least one first switching position, in which the at least one first inlet is connected to the at least one first outlet and the at least one second inlet is connected to the at least one second outlet;
- at least one second switching position, in which the at least one first inlet is connected to the at least one second outlet and the at least one second inlet is connected to the at least one first outlet; and one or more intermediate positions, in each of which the at least one first inlet is connected to the at least one first outlet and the at least one second outlet, and the at least one second inlet is connected to the at least one first outlet and at least one second outlet;

wherein the at least one mixing valve is adjustable between the at least one first switching position, the at least one second switching position, and the one or more intermediate positions.

7. The heat transfer medium circuit of claim 6, wherein the at least one mixing valve is continuously rotatable between the at least one first switching position, the at least one second switching position, and the one or more intermediate positions.

8. The heat transfer medium circuit of claim 5, the mixing device further comprising:

at least one first multi-way valve in selective fluid communication with the first partial heat transfer medium circuit and the second partial circuit; and at least one second multi-way valve in selective fluid communication with the first partial heat transfer medium circuit and the second partial circuit;

wherein at least one second multi-way valve is parallel to the first multi-way valve.

9. The heat transfer medium circuit of claim 8, the at least one first multi-way valve further comprising:

at least one inlet for introducing heat transfer medium from the first partial heat transfer medium circuit;

at least one first outlet for discharging heat transfer medium into the first partial heat transfer medium circuit; and at least one second outlet for discharging heat transfer medium into the second partial circuit; and at least one first switching position, in which the at least one inlet is connected to the at least one first outlet;

at least one second switching position, in which the at least one inlet is connected to the at least one second outlet;

one or more intermediate positions, in each of which the at least one inlet is connected to the at least one first outlet and the at least one second outlet; and a valve member;

wherein the valve member is adjustable, between the at least one first switching position, the at least one second switching position, and the one or more intermediate positions.

10. The heat transfer medium circuit of claim 9, wherein the valve member is continuously rotatable between the first switching position, the second switching position, and the intermediate position or positions.

11. The heat transfer medium circuit of claim 8, the at least one second multi-way valve further comprising:

at least one inlet for introducing heat transfer medium from the second partial circuit;

at least one first outlet for discharging heat transfer medium into the first partial heat transfer medium circuit;

at least one second outlet for discharging heat transfer medium into the second partial circuit;

at least one first switching position, in which the at least one inlet is connected to the at least one first outlet;

at least one second switching position, in which the at least one inlet is connected to the at least one second outlet;

one or more intermediate positions, in each of which the at least one inlet is connected to the at least one first outlet and the at least one second outlet; and a valve member;

wherein the valve member is adjustable, between the at least one first switching position, the at least one second switching position, and the one or more intermediate positions.

12. The heat transfer medium circuit of claim 9, wherein the valve member is continuously rotatable between the first switching position, the second switching position, and the intermediate position or positions.

13. The heat transfer medium circuit of claim 1, further comprising at least one heat exchanger (106) for transferring heat between the first partial circuit and the second partial circuit.

14. The heat transfer medium circuit of claim 1, further comprising:

a third partial circuit, further comprising:

at least one electric motor for driving the motor vehicle, which the at least one electric motor is heated and/or cooled by the heat transfer medium flowing through the third partial circuit, and is supplied with electric energy by the at least one electric energy store; and a switching device for directing one or more fractions of the heat transfer medium between the second partial circuit and the third partial circuit;

wherein the switching device is switched selectively to one or more operating states for directing the one or more fractions of the heat transfer medium between the second partial circuit and the third partial circuit.

15. The heat transfer medium circuit of claim 14, wherein the switching device is switched selectively to various intermediate positions of the one or more operating states for directing in each case a portion of the one or more fractions of the heat transfer medium, each of which differs from the other intermediate positions, flowing between the second partial circuit and the third partial circuit or is adjusted continuously between at least two of the various intermediate positions.

16. The heat transfer medium circuit of claim 1, the motor vehicle further comprising at least one electric motor for driving the motor vehicle.

17. The heat transfer medium circuit of claim 16, the motor vehicle further comprising at least one internal combustion engine for driving the motor vehicle.

18. The heat transfer medium circuit of claim 16, the motor vehicle further comprising at least on fuel cell in particular for supplying the electric motor.

19. The heat transfer medium circuit of claim 16, wherein the mixing device is switched to one of the plurality of operating states.

* * * * *